US009523400B2

United States Patent
Endo et al.

(10) Patent No.: US 9,523,400 B2
(45) Date of Patent: Dec. 20, 2016

(54) LOCKUP CLUTCH CONTROL DEVICE

(71) Applicants: JATCO Ltd, Fuji-shi, Shizuoka (JP); NISSAN MOTOR CO., LTD., Yokohama-shi, Kanagawa (JP)

(72) Inventors: Yasuhiro Endo, Isehara (JP); Kouji Saitou, Machida (JP); Kenji Nakashima, Isehara (JP); Akito Suzuki, Tokyo (JP); Kyounggon Choi, Atsugi (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 15/021,514

(22) PCT Filed: Oct. 17, 2014

(86) PCT No.: PCT/JP2014/077630
§ 371 (c)(1),
(2) Date: Mar. 11, 2016

(87) PCT Pub. No.: WO2015/064376
PCT Pub. Date: May 7, 2015

(65) Prior Publication Data
US 2016/0230822 A1    Aug. 11, 2016

(30) Foreign Application Priority Data

Oct. 31, 2013 (JP) .................................. 2013-226441

(51) Int. Cl.
*B60W 10/02*      (2006.01)
*F16D 48/06*      (2006.01)
(Continued)

(52) U.S. Cl.
CPC .......... *F16D 48/066* (2013.01); *B60W 10/026* (2013.01); *F16H 45/02* (2013.01);
(Continued)

(58) Field of Classification Search
None
See application file for complete search history.

(56) References Cited

U.S. PATENT DOCUMENTS 5,651,752 A * 7/1997 Wakahara ............. F16H 61/143
                                                477/110
6,074,319 A * 6/2000 Sato ....................... F16H 61/061
                                                475/120
(Continued)

FOREIGN PATENT DOCUMENTS

JP    S63-182352 U    11/1988
JP    H05-223132 A    8/1993
(Continued)

*Primary Examiner* — Justin Holmes
(74) *Attorney, Agent, or Firm* — Foley & Lardner LLP

(57) ABSTRACT

First temporary capacity reduction control that when acceleration ON is judged during coasting lock-up, brings lock-up clutch (20) into slip state by decreasing torque transmission capacity of lock-up clutch and subsequently returns lock-up clutch to lock-up state by increasing torque transmission capacity is executed. Control unit performing second temporary capacity reduction control that when return of accelerator pedal depression is judged during the progress of returning to lock-up state, decreases torque transmission capacity again and subsequently returns lock-up clutch to lock-up state by increasing torque transmission capacity is provided. In second temporary capacity reduction control, torque transmission capacity is decreased with predetermined torque transmission capacity by which lock-up clutch is not fully disengaged being lower limit value. Abrupt engagement of lock-up clutch and engine racing can be therefore avoided when acceleration is changed from ON to (Continued)

OFF during control of lock-up clutch from disengagement or slip state to lock-up state.

4 Claims, 4 Drawing Sheets

(51) Int. Cl.
*F16H 45/02* (2006.01)
*F16H 45/00* (2006.01)

(52) U.S. Cl.
CPC ............... *B60W 2510/025* (2013.01); *B60W 2510/0208* (2013.01); *B60W 2540/10* (2013.01); *B60W 2710/024* (2013.01); *F16D 2500/10487* (2013.01); *F16D 2500/70247* (2013.01); *F16H 2045/002* (2013.01)

(56) References Cited

U.S. PATENT DOCUMENTS

| | | | |
|---|---|---|---|
| 6,345,223 B1 * | 2/2002 | Takizawa | B60T 8/3215 477/166 |
| 2002/0091477 A1 * | 7/2002 | Hagiwara | F16H 61/143 701/67 |
| 2003/0060330 A1 | 3/2003 | Sato et al. | |

FOREIGN PATENT DOCUMENTS

| | | |
|---|---|---|
| JP | 2002-357270 A | 12/2002 |
| JP | 2003-097696 A | 4/2003 |
| JP | 2010-210008 A | 9/2010 |

* cited by examiner

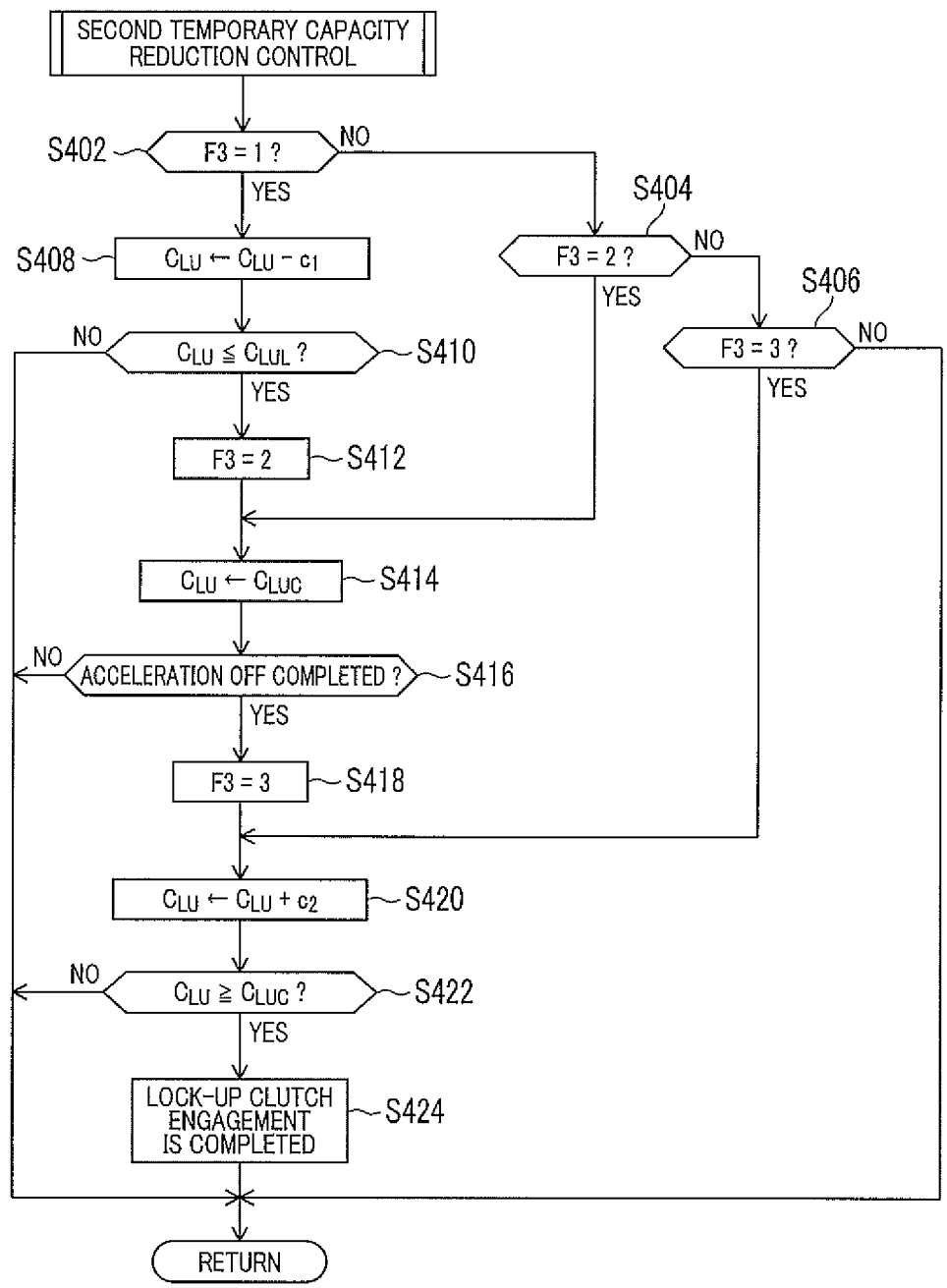

LOCKUP CLUTCH CONTROL DEVICE

The present invention relates to a control device of a lock-up clutch mounted in a vehicle.

BACKGROUND ART

Some vehicles such as an automobile have a lock-up clutch in a torque convertor interposed between an engine and an automatic transmission mechanism. As a control of this lock-up clutch, Patent Document 1 discloses a technique in which, in a case where acceleration ON is made at a time of lock-up during a coasting travel (at a time of so-called coasting lock-up), in order to avoid a large torque shock caused by action of a counter torque whose torque transmission direction is reversed, full engagement of the lock-up clutch is forbidden.

Here, after a fully engaged state (i.e. the lock-up) of the lock-up clutch is forbidden by the acceleration ON during the coasting lock-up as described above and the lock-up clutch is in a disengaged state or a slip state, a control that brings the lock-up clutch to the fully engaged state (a lock-up state) again is favorable to improvement in fuel efficiency.

However, in a case where, during the coasting lock-up, an accelerator pedal is depressed only for a short time and subsequently the depression is released, since acceleration OFF is made in a state in which the lock-up clutch is controlled toward the full engagement by the acceleration ON, i.e. during increase in hydraulic pressure supplied to the lock-up clutch, the following problems arise.

For instance, even if the acceleration OFF is made from the acceleration ON, when the hydraulic pressure supplied to the lock-up clutch continues being increased to attempt to bring the lock-up clutch to the fully engaged state, since torque of the engine is decreased by the acceleration OFF, a torque transmission capacity required for the full engagement of the lock-up clutch is decreased, meanwhile, due to the increase of the supplied hydraulic pressure, a torque transmission capacity of the lock-up clutch is increased. Because of this, a balance between an output torque of the engine and the torque transmission capacity of the lock-up clutch suddenly changes, then there is a possibility that the lock-up clutch will suddenly be engaged and a shock will occur.

On the other hand, if the hydraulic pressure having been increased to attempt to bring the lock-up clutch to the fully engaged state is decreased too much by the acceleration OFF, the torque transmission capacity of the lock-up clutch decreases too much, and the lock-up clutch might be in a fully disengaged state. If an acceleration is requested immediately after this full engagement, engine racing (RPM surge) occurs, and fuel efficiency is deteriorated.

CITATION LIST

Patent Document

Patent Document 1: Japanese Unexamined Utility Model Application Publication No. 63-182352 (JPU11988182352)

SUMMARY OF THE INVENTION

The present invention was made in view of the above technical problem. An object of the present invention is therefore to provide a control device of a lock-up clutch which is capable of avoiding the sudden engagement of the lock-up clutch and the surge of engine rotation speed in the case where the acceleration is ON only for a short time and subsequently the acceleration is OFF during the coasting lock-up.

A control device of a lock-up clutch of the present invention is a control device controlling the lock-up clutch provided between an engine and an automatic transmission mechanism mounted in a vehicle by hydraulic pressure. The control device comprises: a coasting judgment unit that judges whether the vehicle is in a coasting travel state; an acceleration judgment unit that judges depression of an accelerator pedal of the vehicle, return of the depression of the accelerator pedal, acceleration ON and acceleration OFF; and a control unit that controls a torque transmission capacity of the lock-up clutch on the basis of judgment information of the coasting judgment unit and the acceleration judgment unit. The control unit performs a coasting lock-up control that when a predetermined coasting lock-up condition is satisfied in a state in which the vehicle is in the coasting travel state, brings the lock-up clutch into a lock-up state, a first temporary capacity reduction control that when the acceleration ON of the accelerator pedal is judged in a state in which the lock-up clutch is in the lock-up state by the coasting lock-up control, brings the lock-up clutch into a slip state by decreasing the torque transmission capacity and subsequently returns the lock-up clutch to the lock-up state by increasing the torque transmission capacity, and a second temporary capacity reduction control that when the return of the depression of the accelerator pedal is judged during the progress of the returning of the lock-up clutch to the lock-up state by the first temporary capacity reduction control, decreases the torque transmission capacity again and subsequently returns the lock-up clutch to the lock-up state again by increasing the torque transmission capacity. In the second temporary capacity reduction control, the torque transmission capacity is decreased with a predetermined torque transmission capacity by which the lock-up clutch is not fully disengaged being a lower limit value.

It is desirable that the predetermined torque transmission capacity is a torque capacity equivalent to an input torque that is inputted to the lock-up clutch when the vehicle is in the coasting travel state.

It is desirable that when the torque transmission capacity reaches the lower limit value before the acceleration OFF is judged by the acceleration judgment unit in the second temporary capacity reduction control, the control unit holds the torque transmission capacity to the lower limit value until the acceleration OFF is judged by the acceleration judgment unit.

It is desirable that when the acceleration OFF is judged by the acceleration judgment unit in a state in which the torque transmission capacity is held to the lower limit value, the control unit gradually increases the torque transmission capacity.

According to the control device of the lock-up clutch of the present invention, in a case where acceleration ON is made (accelerator pedal is ON) only for a short time and subsequently acceleration OFF is made (accelerator pedal is OFF) during the coasting lock-up, the torque transmission capacity of the lock-up clutch is decreased with a predetermined torque transmission capacity by which the lock-up clutch is not fully disengaged being a lower limit value. Therefore, the lock-up clutch is not abruptly engaged, and also the lock-up clutch is not abruptly fully disengaged. Hence, it is possible to suppress engine racing (RPM surge) by an amount of the torque transmission capacity of the lock-up clutch even immediately after decreasing the torque transmission capacity up to the predetermined torque transmission capacity of the lower limit value, then deterioration of the fuel efficiency can be suppressed.

As described in claim 2, if the predetermined torque transmission capacity is a torque capacity equivalent to an input torque that is inputted to the lock-up clutch when the vehicle is in the coasting travel state, the lock-up clutch is not abruptly engaged, and also the lock-up clutch is not abruptly fully disengaged, even after the acceleration OFF.

As described in claim 3, if the torque transmission capacity is held to the lower limit value until the acceleration OFF is made, the lock-up clutch is not abruptly engaged, and also the lock-up clutch is not abruptly fully disengaged.

As described in claim 4, if the torque transmission capacity is gradually increased when the acceleration OFF is made in a state in which the torque transmission capacity is held to the lower limit value, the lock-up clutch can be brought into a full lock-up state. Therefore, the engine is dragged from the driving wheel by the lock-up clutch, and for instance, by bringing the engine into a fuel cut state, deterioration of the fuel efficiency can be suppressed.

BRIEF DESCRIPTION OF DRAWINGS

FIG. 4 is a flow chart for explaining a second temporary capacity reduction control by the control device of the lock-up clutch according to the embodiment of the present invention.

EMBODIMENTS FOR CARRYING OUT THE INVENTION

In the following description, embodiments of the present invention will be explained with reference to the drawings. The embodiments are examples of the present invention, and these do not exclude various modifications and techniques which are not indicated in the embodiments.

First, a configuration of a driveline and control system of a vehicle that employs a control device of a lock-up clutch according to the present embodiment will be explained. In the present embodiment, as an example, a belt-type continuously variable transmission (hereinafter called a belt-type CVT or simply, a CVT) is used as an automatic transmission. However, as the automatic transmission, other continuously variable transmission such as a toroidal CVT, or a multi-range transmission, could be used.

[General System Configuration]

Figure 1:
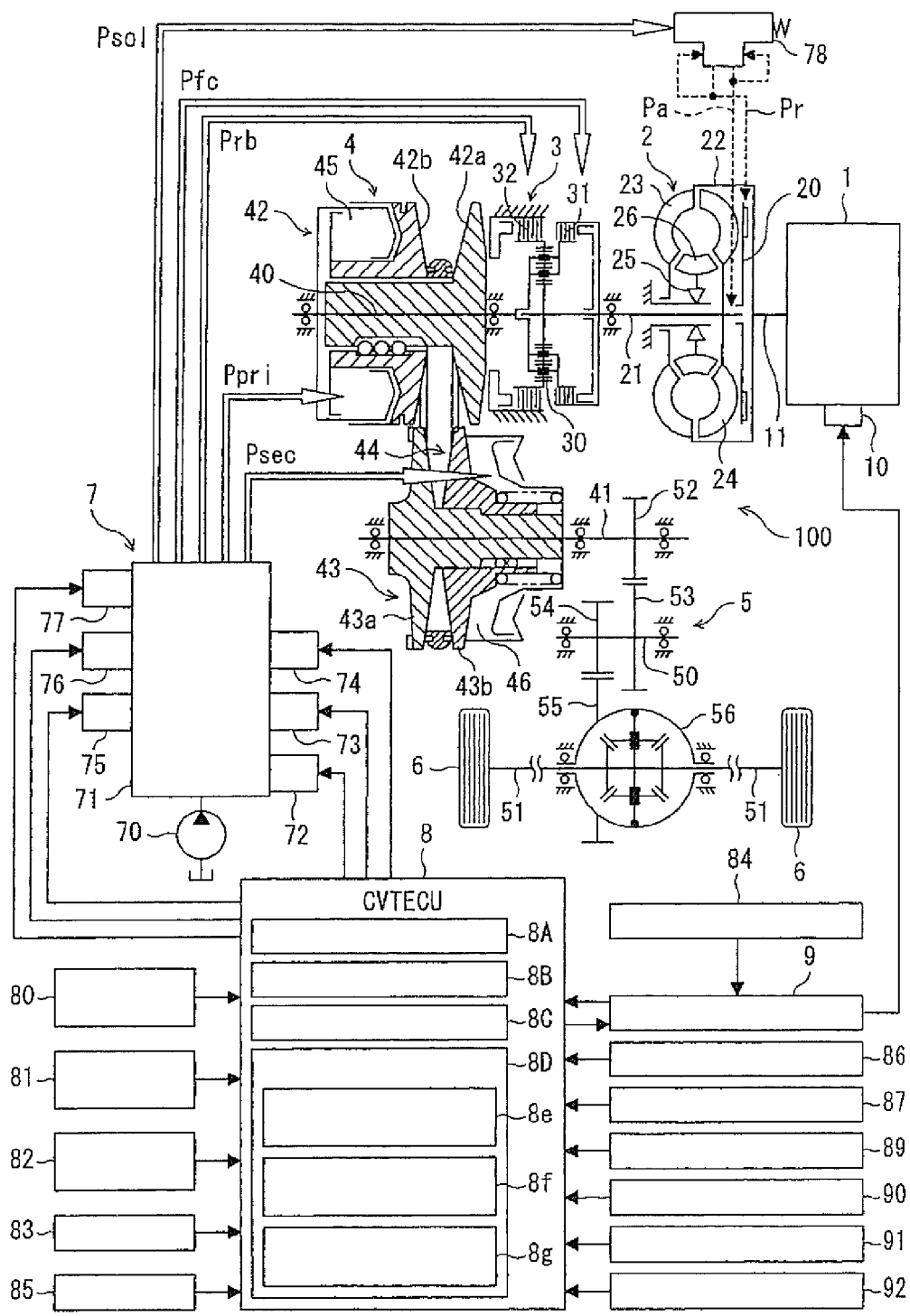
FIG. 1 is a general system diagram showing a driveline and control system of a vehicle that employs a control device of a lock-up clutch according to an embodiment of the present invention.

FIG. 1 is a general system diagram showing a driveline and control system of a vehicle according to the present embodiment.

As shown in FIG. 1, the driveline of the vehicle has an engine (an internal combustion engine) 1, a torque convertor 2, a forward-reverse switching mechanism 3, a belt-type continuously variable transmission mechanism (an automatic transmission mechanism) 4, a final speed reduction mechanism 5 and driving wheels 6, 6. Here, the torque convertor 2, the forward-reverse switching mechanism 3, the belt-type continuously variable transmission mechanism 4 and the final speed reduction mechanism 5 are accommodated in a transmission case, and this forms a belt-type continuously variable transmission (CVT) 100.

The engine 1 is provided with an output torque control actuator 10 that performs an output torque control by a throttle valve opening/closing operation and/or a fuel cut operation etc. With this control, besides an output torque control by driver's accelerator operation, the engine 1 can be output-torque-controlled by an external engine control signal.

The torque convertor 2 is a starting element having a torque increase function. The torque convertor 2 has a lock-up clutch 20 that can directly connect an engine output shaft (=a torque convertor input shaft) 11 and a torque convertor output shaft 21 when the torque increase function is not required. The torque convertor 2 further has, as components, a pump impeller 23 directly connected to the engine output shaft 11 through a convertor housing 22, a turbine runner 24 directly connected to the torque convertor output shaft 21 and a stator 26 provided at a case through a one-way clutch 25.

The lock-up clutch 20 is changeover-controlled so as to be brought to any one of a lock-up state (a clutch fully engaged state), an unlock-up state (a clutch fully disengaged state) and a slip lock-up state (a clutch slip engaged state, i.e. a state in which although there is a rotation difference in rotation speed between an input side rotation member and an output side rotation member of the lock-up clutch, torque is transmitted from the input side to the output side of the lock-up clutch) according to a vehicle condition and an operating condition. This changeover-control and a control of a clutch engagement force for the lock-up state and the slip lock-up state, namely a control of a torque transmission capacity of the clutch, are carried out by a control of a supply hydraulic pressure supplied to the lock-up clutch 20. That is, the controls are carried out by controlling a pressure difference between oil chambers (not shown) at front and rear sides of the lock-up clutch 20, i.e. a pressure difference (a lock-up pressure difference) $\Delta P$ (=Pa−Pr) between a torque convertor supply pressure Pa in an apply chamber and a torque convertor release pressure Pr in a release chamber. The lock-up pressure difference $\Delta P$ corresponds to the supply hydraulic pressure supplied to the lock-up clutch 20.

The forward-reverse switching mechanism 3 is a mechanism that switches an input rotation direction to the belt-type continuously variable transmission mechanism 4 between a forward direction for forward travel and a reverse direction for reverse travel. This forward-reverse switching mechanism 3 has a double pinion planetary gear 30, a forward clutch 31 (a forward side frictional engagement element) formed by a plurality of clutch plates and a reverse brake 32 (a reverse side frictional engagement element) formed by a plurality of brake plates.

The forward clutch 31 is engaged by a forward clutch pressure Pfc when a forward travel range such as D-range (Drive range) is selected. The reverse brake 32 is engaged by a reverse brake pressure Prb when R-range (Reverse range) that is reverse travel range is selected. Here, when N-range (Neutral range, no-travel range) is selected, the forward clutch 31 and the reverse brake 32 are each disengaged by draining the forward clutch pressure Pfc and the reverse brake pressure Prb.

The belt-type continuously variable transmission mechanism 4 has a continuously variable transmission function that continuously varies a transmission ratio that is a ratio between a transmission input rotation speed and a transmission output rotation speed by change of a belt contact diameter. The belt-type continuously variable transmission mechanism 4 has a primary pulley 42, a secondary pulley 43 and a belt 44. The primary pulley 42 is formed by a fixed pulley 42a and a slide pulley 42b. The slide pulley 42b moves in an axial direction by a primary pressure Ppri that is supplied in a primary pressure chamber 45. The secondary pulley 43 is formed by a fixed pulley 43a and a slide pulley 43b. The slide pulley 43b moves in an axial direction by a secondary pressure Psec that is supplied in a secondary pressure chamber 46.

Sheave surfaces, which are facing surfaces, of the fixed pulley 42a and the slide pulley 42b of the primary pulley 42, and sheave surfaces, which are facing surfaces, of the fixed pulley 43a and the slide pulley 43b of the secondary pulley 43, each have a V-shaped surface. Flank surfaces at both sides of the belt 44 contact each of these sheave surfaces. A winding radius of the belt 44, which is wound around both the primary pulley 42 and secondary pulley 43, is changed according to movement of the slide pulleys 42b and 43b, and thus the transmission ratio is varied.

The final speed reduction mechanism 5 is a mechanism that reduces a transmission output rotation from a transmission output shaft 41 of the belt-type continuously variable transmission mechanism 4 and transmits it to the right and left driving wheels 6, 6 with a differential function provided. This final speed reduction mechanism 5 has a first gear 52, a second gear 53, a third gear 54 and a fourth gear 55, which are installed by the transmission output shaft 41, an idler gear 50 and right and left drive shafts 51, 51 and which have a speed reduction function, and a differential gear 56 which has the differential function.

As shown in FIG. 1, a control system of the CVT 100, of the control system of the vehicle, has a hydraulic control unit 7 and a CVT electronic control unit (a CVTECU) 8. Further, an engine electronic control unit (an engine ECU) 9 that sends/receives information to/from this CVTECU 8 is provided. These electronic control units (ECU: Electronic Control Unit) 8, 9 are formed by an input/output device, a storage device (ROM, RAM, BURAM etc.) that stores a plurality of control program, a central processing unit (CPU), a timer counter etc.

The hydraulic control unit 7 is a control unit that produces the primary pressure Ppri led to the primary pressure chamber 45, the secondary pressure Psec led to the secondary pressure chamber 46, the forward clutch pressure Pfc for the forward clutch 31, the reverse brake pressure Prb for the reverse brake 32 and a solenoid pressure Psol for a lock-up control valve 78. This hydraulic control unit 7 has an oil pump 70 and a hydraulic control circuit 71. The hydraulic control circuit 71 has a line pressure solenoid 72, a primary pressure solenoid 73, a secondary pressure solenoid 74, a forward clutch pressure solenoid 75, a reverse brake pressure solenoid 76 and a lock-up solenoid 77.

The line pressure solenoid 72 regulates, according to a line pressure instruction outputted from the CVTECU 8, a working fluid (a hydraulic fluid) that is pumped out and pressurized by the oil pump 70 to an instructed line pressure PL.

The primary pressure solenoid 73 reduces and regulates, according to a primary pressure instruction outputted from the CVTECU 8, the line pressure PL as a source pressure to an instructed primary pressure Ppri.

The secondary pressure solenoid 74 reduces and regulates, according to a secondary pressure instruction outputted from the CVTECU 8, the line pressure PL as the source pressure to an instructed secondary pressure Psec.

The forward clutch pressure solenoid 75 reduces and regulates, according to a forward clutch pressure instruction outputted from the CVTECU 8, the line pressure PL as the source pressure to an instructed forward clutch pressure Pfc.

The reverse brake pressure solenoid 76 reduces and regulates, according to a reverse brake pressure instruction outputted from the CVTECU 8, the line pressure PL as the source pressure to an instructed reverse brake pressure Prb.

The lock-up solenoid 77 produces the solenoid pressure Psol for the lock-up control valve 78 with a solenoid force by a duty signal Duty from the CVTECU 8 being an operation signal force. The lock-up control valve 78 produces the lock-up pressure difference ΔP (=Pa−Pr), which is the pressure difference between the clutch front and rear side oil chambers of the lock-up clutch 20, with the solenoid pressure Psol being an operation signal pressure.

The CVTECU 8 performs a line pressure control that outputs an instruction to obtain a target line pressure according to the throttle opening etc. to the line pressure solenoid 72, a transmission hydraulic pressure control that outputs an instruction to obtain a target transmission ratio according to a vehicle speed and the throttle opening etc. to the primary pressure solenoid 73 and the secondary pressure solenoid 74, and a forward-reverse switching control that outputs an instruction to control engagement/disengagement of the forward clutch 31 and the reverse brake 32 to the forward clutch pressure solenoid 75 and the reverse brake pressure solenoid 76. The CVTECU 8 further performs a control of the engagement, the disengagement and the slip engagement (the clutch slip engagement) of the lock-up clutch 20 by outputting the duty signal Duty to the lock-up solenoid 77.

The CVTECU 8 inputs sensor information and switch information from a primary rotation sensor 80, a secondary rotation sensor 81, a secondary pressure sensor 82, an oil temperature sensor 83, an engine rotation speed sensor 84, a brake switch 85, an accelerator opening sensor 86, a primary pressure sensor 87 and a line pressure sensor 89, a vehicle speed sensor 90, an accelerator opening sensor 91 and an idle switch 92 etc. Further, the CVTECU 8 inputs torque information from the engine ECU 9, and outputs a torque request to the engine ECU 9. Here, an inhibitor switch (not shown) detects a range position (D-range, N-range, R-range etc.) selected by driver's shift lever operation, and outputs a range position signal according to the range position.

[Configuration of Control Device of Lock-Up Clutch]

The control device of the lock-up clutch according to the present embodiment is a device that performs a control (a coasting lock-up control) carrying out a coasting lock-up for engaging the lock-up clutch and a control pertinent to this coasting lock-up when a predetermined control condition (a coasting lock-up control condition) is satisfied. This control device is formed from function elements provided in the CVTECU 8 and sensors and the like.

Figure 2:
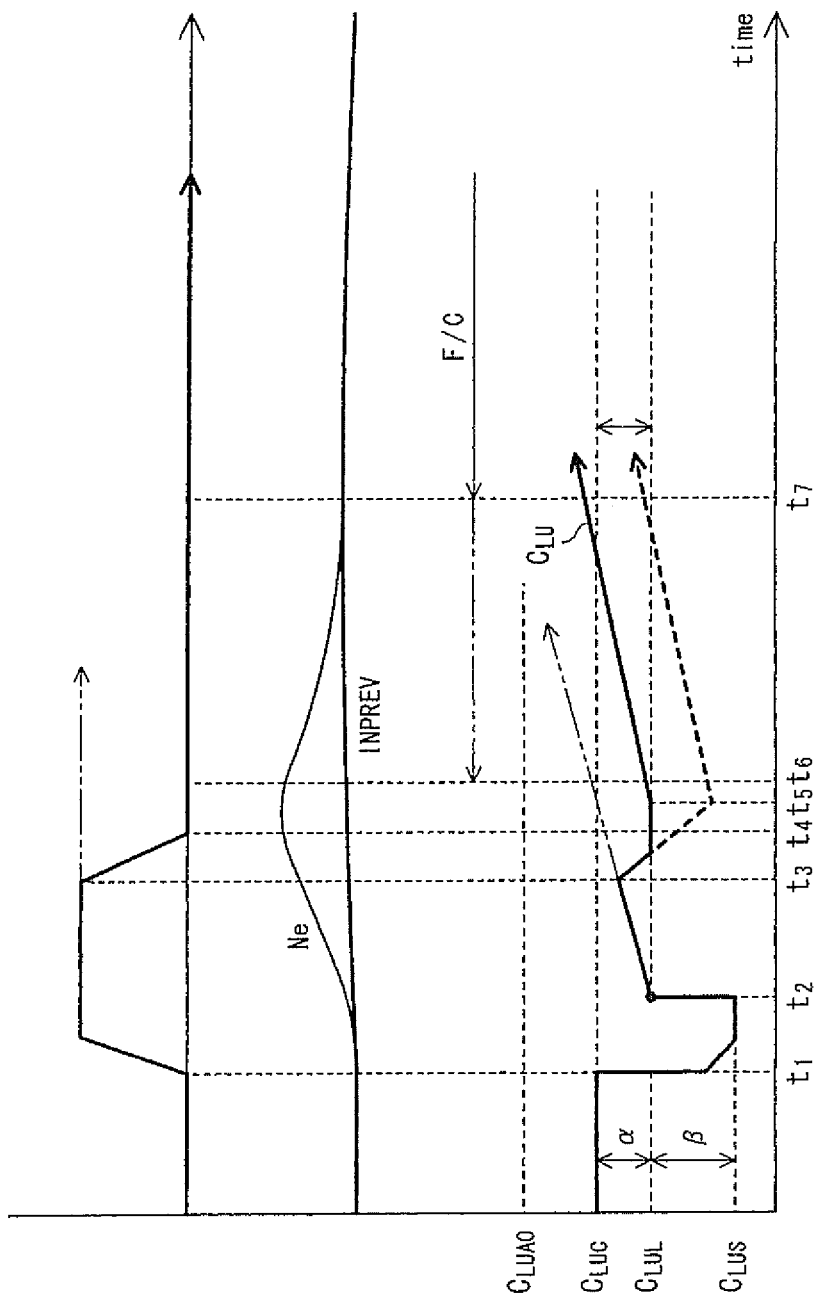
FIGS. 2A to 2C are time charts for explaining each control by the control device of the lock-up clutch according to the embodiment of the present invention.

The control device performs the control with a situation shown by time charts in FIG. 2 assumed. FIGS. 2A to 2C show an accelerator opening (FIG. 2A), an engine rotation speed (an engine revolution speed) Ne and a revolution speed INPREV of a transmission input shaft (FIG. 2B) and the torque transmission capacity (a clutch capacity) of the lock-up clutch 20 (FIG. 2C) according to each control mode. Here, a case where depression of an accelerator pedal for a short time and a subsequent release of the depression (a bit depression-and-release or an instantaneous depression-and-release) are done during execution of the coasting lock-up is assumed, and this case is indicated by a solid line in FIG. 2.

A two-dot chain line in FIG. 2 indicates a case where the release of the depression is not done after the accelerator pedal depression.

The CVTECU 8 has, as the function elements, a coasting judgment section (a coasting judgment unit or a coasting judgment means) 8A, an acceleration judgment section (an acceleration judgment unit or an acceleration judgment means) 8B, a learning control section (a learning control unit or a learning control means) 8C and a control section (a control unit or a control means) 8D that controls the torque transmission capacity of the lock-up clutch 20 on the basis of judgment information of the coasting judgment section 8A and the acceleration judgment section 8B. The control device is formed from these coasting judgment section 8A, acceleration judgment section 83, learning control section 8C and control section 83.

The coasting judgment section 8A judges whether the vehicle is in a coasting state. This judgment is made according to whether the idle switch 92 is ON. However, this judgment could be made according to whether the accelerator opening sensor 91 is less than a predetermined minute value that is close to 0. Or alternatively, this judgment might be made on the basis of a ratio between the engine revolution speed (an impeller rotation speed of the torque convertor) and the transmission input shaft revolution speed (a turbine rotation speed of the torque convertor).

The acceleration judgment section 8B judges the accelerator pedal depression and return of the depression and also acceleration ON and acceleration OFF on the basis of detection information from the accelerator opening sensor 91 as an acceleration state detection unit (an acceleration state detection means). For example, if the accelerator opening detected by the accelerator opening sensor 91 increases, "the accelerator pedal depression" is judged. If the detected accelerator opening decreases, "the return of the accelerator pedal depression" is judged. Further, if a value of the detection information from the accelerator opening sensor 91 is a minute judgment threshold value or greater, "acceleration ON" is judged. If the value of the detection information from the accelerator opening sensor 91 is less than the minute judgment threshold value, "acceleration OFF" is judged.

Regarding the judgment of "the accelerator pedal depression", "the return of the accelerator pedal depression", "acceleration ON" and "acceleration OFF", in order to judge them without being affected by noise etc., the judgment is made with a low-pass filtering operation, such as moving average and smoothing, of the detection information from the accelerator opening sensor 91 performed. Since the judgment threshold value for the judgment of the "acceleration ON" and "acceleration OFF" is a minute value that is close to an opening degree 0, it takes more time to judge "acceleration OFF" than that to judge "acceleration ON" in a case of a normal acceleration operation. Furthermore, on the basis of detection information from the idle switch 92, if the idle switch 92 is OFF, "acceleration ON" could be judged. If the idle switch 92 is ON, "acceleration OFF" could be judged.

Next, the learning control section 8C will be explained. The learning control section 8C determines a hydraulic pressure at which the lock-up clutch 20 starts to slip by reducing the hydraulic pressure (i.e. the lock-up pressure difference $\Delta P$) supplied to the lock-up clutch 20 during the coasting lock-up where the lock-up clutch 20 is engaged by the coasting lock-up control by a coasting lock-up control section 8e, and stores this hydraulic pressure as a slip achieving hydraulic pressure.

The hydraulic pressure (the lock-up pressure difference $\Delta P$) supplied to the lock-up clutch 20 defines a torque transmission capacity (also called a clutch capacity) $C_{LU}$ of the lock-up clutch 20. Therefore, when focusing attention on the torque transmission capacity $C_{LU}$, a torque transmission capacity $C_{LU}$ corresponding to the learned slip achieving hydraulic pressure is present, and this capacity is set as a coasting capacity learning value $C_{LUL}$. This coasting capacity learning value $C_{LUL}$ is a minimum torque capacity which brings the lock-up clutch 20 into the engaged state during a coasting travel. The coasting capacity learning value $C_{LUL}$ is also called a coasting lock-up capacity, or also called a reference capacity since this capacity is used as a reference of the clutch torque capacity control.

The control section 8D has the function (the coasting lock-up control section) 8e performing the coasting lock-up control that brings the lock-up clutch 20 into the lock-up state during the coasting travel of the vehicle, a function (a first temporary capacity reduction control section) 8f performing a first temporary capacity reduction control that when the acceleration ON is made during the coasting lock-up control, temporarily decreases (reduces) the torque transmission capacity of the lock-up clutch 20 and subsequently increases and returns the torque transmission capacity, and a function (a second temporary capacity reduction control section) 8g performing a second temporary capacity reduction control that when the depression of the accelerator pedal is returned during the progress of the returning to the lock-up by the first temporary capacity reduction control, temporarily decreases (reduces) the torque transmission capacity of the lock-up clutch 20 again and subsequently increases and returns the torque transmission capacity.

The coasting lock-up control section 8e increases the torque transmission capacity and brings the lock-up clutch 20 into the lock-up state when the predetermined coasting lock-up condition is satisfied in a state in which the coasting travel state of the vehicle is judged by the coasting judgment section 8A.

Here, the control is done while focusing attention on the torque transmission capacity $C_{LU}$ of the lock-up clutch 20, and the lock-up pressure difference $\Delta P$ is increased so that the torque transmission capacity $C_{LU}$ of the lock-up clutch 20 becomes a coasting travel engagement capacity $C_{LUC}$ previously set as a clutch capacity by which the lock-up clutch 20 is fully engaged and transmits the torque during the coasting travel, and as shown in FIG. 2C, the coasting travel engagement capacity $C_{LUC}$ is held.

This coasting travel engagement capacity $C_{LUC}$ is set to a value that is greater than the coasting lock-up capacity (the coasting capacity learning value) $C_{LUL}$, which is the reference capacity, by a predetermined amount $\alpha$ so that the lock-up clutch 20 is surely fully engaged. Here, in general, in the case of the acceleration ON, an output torque according to the accelerator opening is inputted to the lock-up clutch 20 from the engine, and an input torque during the acceleration ON is greater than an input torque during the coasting travel. Thus, in general, a torque transmission capacity $C_{LUAO}$ by which the lock-up clutch 20 is fully engaged during the acceleration ON is greater than the coasting travel engagement capacity $C_{LUC}$, and this capacity is determined according to the engine output at that time.

As the coasting lock-up control condition when the vehicle is in the coasting state, it is that a vehicle speed V is equal to or greater than a reference vehicle speed V1 (a vehicle speed condition). This vehicle speed condition is set in order to exclude a state of an extremely low vehicle speed. That is, in the extremely low vehicle speed state, the engine tends to stall by the coasting lock-up due to the fact that an idling rotation speed of the engine 1 is low. To avoid this, the vehicle speed condition is provided.

The first temporary capacity reduction control section 8f starts the first temporary capacity reduction control if the acceleration ON is judged when the lock-up clutch 20 is in the lock-up state by the coasting lock-up control. In this first temporary capacity reduction control, after decreasing the torque transmission capacity and bringing the lock-up clutch 20 into the slip state, by increasing the torque transmission capacity, the lock-up clutch 20 is returned to the lock-up state.

In the first temporary capacity reduction control, a control decreasing the torque transmission capacity and bringing the lock-up clutch 20 into the slip state is called a first slip control. Further, a control increasing the torque transmission capacity and returning the lock-up clutch 20 to the lock-up state after the first slip control is called a first smooth-ON control with the aim of gradually increasing the torque transmission capacity and smoothly shifting the lock-up clutch 20 to the lock-up.

For instance, as shown in FIG. 2A as an example, when the accelerator pedal is depressed at time t1, the acceleration ON is judged at the almost same time (in fact, there is a slight delay), and the first slip control is started.

In the first slip control, as shown in FIG. 2C, the torque transmission capacity $C_{LU}$ of the lock-up clutch 20 having been adjusted to the coasting travel engagement capacity $C_{LUC}$ is decreased, only for a slight time, to a slip control capacity $C_{LUS}$ (=$P_{LUL}$-β) that is smaller than the coasting lock-up capacity (the reference capacity) $C_{LUL}$, which is the coasting capacity learning value set by the learning control section 8C, by a predetermined amount β, and subsequently the torque transmission capacity is returned to the reference capacity $C_{LUL}$. The lock-up clutch 20 is brought into the slip state in this manner.

In the first slip control, the torque transmission capacity $C_{LU}$ of the lock-up clutch 20 is decreased to the slip control capacity $C_{LUS}$ that is smaller than the coasting lock-up capacity $C_{LUL}$ by the predetermined amount 3. However, here, as shown in FIG. 2C, the torque transmission capacity is not decreased to the slip control capacity $C_{LUS}$ at once (at one stroke), but decreased up to a middle capacity that is smaller than the reference capacity $C_{LUL}$ and greater than the slip control capacity $C_{LUS}$ at once (at one stroke), and subsequently decreased to the slip control capacity $C_{LUS}$ in a ramp shape. The reason why the torque transmission capacity is decreased in the ramp shape in this manner is because disengagement of the lock-up clutch 20, which occurs due to overshoot of the decrease of the torque transmission capacity $C_{LU}$, has to be prevented.

In addition, the decrease to the slip control capacity $C_{LUS}$ by the first slip control is done only for the slight time (e.g. about 0.2 sec) from time t1 to time t2. That is, in order to quickly or instantaneously change the state of the lock-up clutch 20 from the engaged state to the slip state, the torque transmission capacity $C_{LU}$ of the lock-up clutch 20 is decreased to the slip control capacity $C_{LUS}$ that is smaller than the reference capacity $C_{LUL}$ by the predetermined amount β only for the slight time, and subsequently the torque transmission capacity is returned to the reference capacity $C_{LUL}$.

Even though the torque transmission capacity is returned to the reference capacity $C_{LUL}$ in this manner, the lock-up clutch 20 is held in the slip state. This reason is as follows. A torque equivalent to engine brake is inputted to the lock-up clutch 20 from the engine during the coasting travel, whereas in the case of the acceleration ON, the output torque according to the accelerator opening is inputted to the lock-up clutch 20 from the engine, and in general, the input torque during the acceleration ON is greater than the input torque during the coasting travel. Because of this, in the case of the acceleration ON, even though the torque transmission capacity $C_{LU}$ of the lock-up clutch 20 is set to the reference capacity $C_{LUL}$, the lock-up clutch 20 is in the slip state without being fully engaged.

The first smooth-ON control is carried out, as shown in FIG. 2C, from time t2 after bringing the lock-up clutch 20 into the slip state and returning lock-up clutch 20 to the reference capacity $C_{LUL}$ by the first slip control. In this control, in order to bring the lock-up clutch 20 into the fully engaged state, the hydraulic pressure supplied to the lock-up clutch 20 is gradually increased, and the torque transmission capacity $C_{LU}$ of the lock-up clutch 20 is gradually increased from the reference capacity $C_{LUL}$.

That is, in the first smooth-ON control, the torque transmission capacity $C_{LU}$ of the lock-up clutch 20 which has been returned to the reference capacity $C_{LUL}$ is increased at a gentle gradient in a ramp shape. The reason why the torque transmission capacity $C_{LU}$ is increased in the ramp shape is because an occurrence of shock caused by a driving force step has to be prevented upon the engagement of the lock-up clutch 20. If the torque transmission capacity $C_{LU}$ reaches the acceleration-ON engagement capacity $C_{LUAO}$, it can be judged that the lock-up clutch 20 is in the fully engaged state.

Here, the gradient (a rate of increase) at which the torque transmission capacity $C_{LU}$ is increased in the ramp shape is set as appropriate so as to be able to lessen the shock occurring due to the driving force step as mentioned above. Further, a step increase of the torque transmission capacity $C_{LU}$ of the lock-up clutch 20 is not limited to a step increase up to the reference capacity $C_{LUL}$. A capacity decrease lower limit value could be set to a value that is slightly greater or slightly smaller than the reference capacity $C_{LUL}$ as long as the capacity decrease lower limit value is a value that is close to the reference capacity $C_{LUL}$.

The second temporary capacity reduction control section 8g performs the second temporary capacity reduction control that when the return of the depression of the accelerator pedal is judged during the progress of the returning of the lock-up clutch 20 to the lock-up by the first temporary capacity reduction control, i.e. during the progress of the slip of the lock-up clutch 20, decreases (reduces) the torque transmission capacity of the lock-up clutch 20 again and subsequently increases the torque transmission capacity then returns the lock-up clutch 20 to the lock-up state again.

In this second temporary capacity reduction control, since a control decreasing the torque transmission capacity is also a control that brings the lock-up clutch 20 into the slip state, this control is called a second slip control. Further, a control increasing the torque transmission capacity and returning the lock-up clutch 20 to the lock-up state again after the second slip control is called a second smooth-ON control with the aim of gradually increasing the torque transmission capacity and smoothly shifting the lock-up clutch 20 to the lock-up.

For instance, as shown in FIG. 2C, when the return of the accelerator pedal depression starts at time t3, a judgment of this return of the depression is made with almost no delay, and the second slip control is started. That is, as indicated by a solid line in FIG. 2C, the second slip control is started when the acceleration OFF is made during a stage until the torque transmission capacity $C_{LU}$ of the lock-up clutch 20 reaches the acceleration-ON engagement capacity $C_{LUAO}$ by the first smooth-ON control of the first temporary capacity reduction control, i.e. during the slip state in which the lock-up clutch 20 is brought to the full engagement.

In this second slip control, the hydraulic pressure supplied to the lock-up clutch 20 is decreased up to a slip achieving hydraulic pressure at which the slip state of the lock-up clutch 20 is held even though the output torque of the engine 1 is decreased by the return of the accelerator pedal depression, and the torque transmission capacity $C_{LU}$ of the lock-up clutch 20 is decreased.

Since the first temporary capacity reduction control is performed upon the acceleration ON, although the torque transmission capacity required for the full engagement of the lock-up clutch 20 is increased at this time, when the acceleration OFF is made, the torque transmission capacity required for the full engagement of the lock-up clutch 20 is decreased. On the other hand, since the torque transmission capacity of the lock-up clutch 20 is being increased due to increase of the supplied hydraulic pressure, a balance of the torque transmission capacity of the lock-up clutch 20 suddenly changes, and there is a possibility that the lock-up clutch 20 will be abruptly engaged and thus the shock will occur. Further, as measures against this problem, if the lock-up clutch 20 is brought into the fully disengaged state, there is a risk of causing engine racing (RPM surge). The second slip control is a control to resolve these problems.

Therefore, in the second slip control, as a first step, in order to decrease the torque transmission capacity $C_{LU}$ while certainly bringing or holding the lock-up clutch 20 into or in the slip state without bringing the lock-up clutch 20 into the fully disengaged state, a clutch capacity reduction control that decreases the hydraulic pressure supplied to the lock-up clutch 20 in the ramp shape and decreases the torque transmission capacity $C_{LU}$ of the lock-up clutch 20 in the ramp shape is carried out. Here, the reason why the torque transmission capacity $C_{LU}$ of the lock-up clutch 20 is decreased in the ramp shape is because the full disengagement of the lock-up clutch 20 has to be certainly avoided. A gradient (a rate of decrease) at which the torque transmission capacity $C_{LU}$ is decreased in the ramp shape is set as appropriate from this viewpoint. This clutch capacity reduction control could be called a smooth-OFF control.

In a stage in which the second slip control starts, the lock-up clutch 20 is in the slip state. Thus, if the hydraulic pressure supplied to the lock-up clutch 20 is rapidly decreased, there is a risk that the lock-up clutch 20 having been in the slip state will be fully disengaged. Therefore, only the supply hydraulic pressure of the lock-up clutch 20 is decreased in the ramp shape, and the torque transmission capacity $C_{LU}$ is decreased while holding the slip state of the lock-up clutch 20.

Further, in the second slip control, a lower limit value (a capacity decrease lower limit value) to which the torque transmission capacity $C_{LU}$ of the lock-up clutch 20 is decreased is set to the reference capacity (the coasting lock-up capacity) $C_{LUL}$, and when the torque transmission capacity $C_{LU}$ decreases to the reference capacity $C_{LUL}$, a clutch capacity hold control that holds the torque transmission capacity to the reference capacity $C_{LUL}$ is carried out. Although the capacity decrease lower limit value here is set to the reference capacity $C_{LUL}$, the capacity decrease lower limit value could be set to a value that is close to the reference capacity $C_{LUL}$, such as a value that is slightly greater or slightly smaller than the reference capacity $C_{LUL}$.

After judging the return of the accelerator pedal depression, although the accelerator opening decreases and becomes 0 (at time t4), a determination of the acceleration OFF (an acceleration OFF judgment) is made with a slight time lag (at time t5). Until the determination of the acceleration OFF is made in this way, the clutch capacity hold control holding the torque transmission capacity $C_{LU}$ of the lock-up clutch 20 to the reference capacity $C_{LUL}$ continues. And when the acceleration OFF is determined, in the same manner as the above smooth-ON control, the second smooth-ON control that increases the torque transmission capacity $C_{LU}$ of the lock-up clutch 20 at a gentle gradient in a ramp shape is carried out.

In the second smooth-ON control, in the same manner as the first smooth-ON control, the torque transmission capacity $C_{LU}$ of the lock-up clutch 20 is increased at the gentle gradient in the ramp shape. Also in this case, if the torque transmission capacity $C_{LU}$ reaches the coasting travel engagement capacity $C_{LUC}$, the lock-up clutch 20 is brought into the fully engaged state. In this case, too, the gradient (a rate of increase) at which the torque transmission capacity $C_{LU}$ is increased in the ramp shape is set as appropriate so as to be able to lessen the shock occurring due to the driving force step as mentioned above. The gradient here is the same as that of the first smooth-ON control. However, the gradient could be set to a different gradient from that of the first smooth-ON control.

[Operation and Effect]

The control device of the lock-up clutch according to the present embodiment is configured as described above. Therefore, the control of the lock-up clutch 20 can be executed as shown in flow charts in FIGS. 3 and 4. The flow charts in FIGS. 3 and 4 start by receiving an ON-operation of a key switch of the vehicle, and are repeated at a predetermined control cycle period, then end by receiving an OFF-operation of the key switch. F1, F2 and F3 in the flow charts of FIGS. 3 and 4 are control flags.

Figure 3:
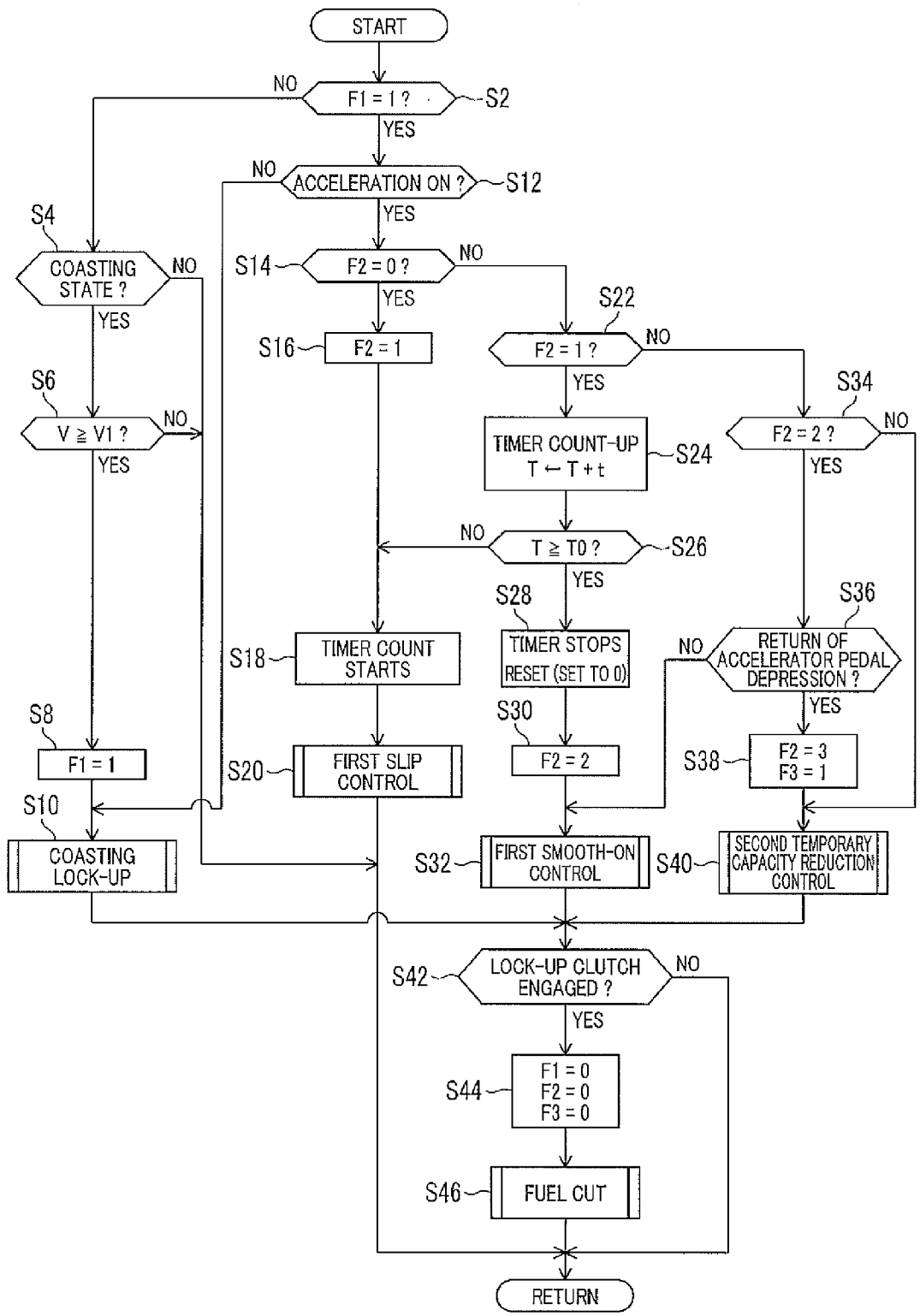
FIG. 3 is a flow chart for explaining each control by the control device of the lock-up clutch according to the embodiment of the present invention.

As shown in FIG. 3, first, a judgment is made as to whether or not a flag F1 is 1 (at step S2). Regarding the flag F1, if the coasting lock-up control condition is satisfied, the flag F1 is set to 1. In a case except this, the flag F1 is set to 0. When the flag F1 is 1, the coasting lock-up control or the first slip control, the smooth-ON control and the second slip control pertinent to this coasting lock-up control are performed.

Here, if the flag F1 is not 1, i.e. if the flag F1 is 0, a judgment is made as to whether or not the vehicle is in the coasting state by the coasting judgment section 8A (at step S4). If judged that the vehicle is in the coasting state, a judgment is made as to whether or not the vehicle speedy is equal to or greater than the reference vehicle speed V1 (at step S6). If the vehicle speed V is equal to or greater than the reference vehicle speed V1, the coasting lock-up control condition is satisfied, and the flag F1 is set to 1 (at step S8), then the coasting lock-up control is started (at step S10). In the coasting lock-up control, the torque transmission capacity $C_{LU}$ of the lock-up clutch 20 is increased to the coasting travel engagement capacity $C_{LUC}$ and is held to this coasting travel engagement capacity $C_{LUC}$. With this, the lock-up clutch 20 is fully engaged, and transmits the torque.

When the flag F1 is set to 1 in this manner, in a next control cycle period, the routine proceeds to step S12 from step S2, and a judgment is made as to whether or not the acceleration ON is made by the acceleration judgment section 8B. If the acceleration ON is not made, the routine proceeds to step S10, and the coasting lock-up control continues.

If the acceleration ON is made, a judgment is made as to whether or not a flag F2 is 0 (at step S14). Regarding the flag F2, if the acceleration ON is made from the coasting lock-up and an execution condition of the first slip control of the first temporary capacity reduction control is satisfied, the flag F2 is set to 1. And after that, if a condition by which the control is shifted to the first smooth-ON control is satisfied, the flag F2 is set to 2. Further, if the accelerator pedal depression is returned during the smooth-ON control and an execution condition of the second slip control of the second temporary capacity reduction control is satisfied, the flag F2 is set to 3. Moreover, in a case except the above, e.g. if the lock-up clutch 20 is fully engaged and the smooth-ON control of the first temporary capacity reduction control or the smooth-ON control of the second temporary capacity reduction control end, the flag F2 is set to 0. If the flag F2 is 1, the first slip control is carried out. If the flag F2 is 2, the smooth-ON control is carried out. If the flag F2 is 3, the second slip control is carried out.

In a first control cycle period after the acceleration ON is made from the coasting lock-up, since the flag F2 is 0, the routine proceeds to step S16 from step S14, and the flag F2 is set to 1. Further, timer count starts (a timer start to count) (at step S18), and the first slip control starts (at step S20). In the first slip control, the torque transmission capacity $C_{LU}$ of the lock-up clutch 20 is decreased to the slip control capacity $C_{LUS}$ (=$P_{LUL}$-β). However, the torque transmission capacity $C_{LU}$ of the lock-up clutch 20 is decreased up to the middle capacity that is smaller than the reference capacity $C_{LUL}$ and greater than the slip control capacity $C_{LUS}$ at once (at one stroke), and subsequently decreased to the slip control capacity $C_{LUS}$ in the ramp shape, then held to the slip control capacity $C_{LUS}$.

When the flag F2 is set to 1 in this manner, in a next control cycle period, the routine proceeds to step S22 from step S2 through steps S12 and S14, and a judgment is made as to whether or not the flag F2 is 1. In this stage, since the flag F2 is 1, the routine proceeds to step S24, and timer count-up is done. That is, a timer count value T is increased by a unit count value t. Subsequently, a judgment is made as to whether or not the timer count value T reaches a setting value T0 (at step S26). The setting value T0 is set to a value corresponding to the slight time (e.g. 0.2 sec) set as an executing time of the first slip control.

If the timer count value T does not reach the setting value T0, the first slip control continues (at step S20). If the timer count value T reaches the setting value T0, the timer stops, and the timer count value T is set to 0 (the timer count value T is reset) (at step S28). Then, the flag F2 is set to 2 (at step S30), and the first smooth-ON control is carried out (at step S32).

Subsequently, a judgment is made as to whether or not the lock-up clutch 20 is fully engaged (at step S42). If the lock-up clutch 20 is not fully engaged, a process in this control cycle period is ended, and the routine proceeds to Return. When the flag F2 is set to 2 in this manner, in a next control cycle period, the routine proceeds to step S34 from step S2 through steps S12, S14 and S22, and a judgment is made as to whether or not the flag F2 is 2.

If the flag F2 is 2, the routine proceeds to step S36, and a judgment is made as to whether or not the return of the accelerator pedal depression is done. If the return of the accelerator pedal depression is not done, the first smooth-ON control continues (at step S32). By the smooth-ON control, the lock-up clutch 20 is fully engaged, and the routine proceeds to step S44. Then, the flags F1, F2 and F3 are each set to 0 (the flags F1, F2 and F3 are each reset), and the fuel cut control is performed (at step S46). Regarding flag F3, it will be explained later.

On the other hand, if the return of the accelerator pedal depression is done before the lock-up clutch 20 is fully engaged during the first smooth-ON control, the routine proceeds to step S38 from step S36, and the flag F2 is set to 3 and also the flag F3 is set to 1, then the second temporary capacity reduction control is carried out (at step S40). After that, in the same manner as the above, a judgment is made as to whether or not the lock-up clutch 20 is fully engaged (at step S42). If the lock-up clutch 20 is not fully engaged, a process in this control cycle period is ended, and the routine proceeds to Return.

When the flag F2 is set to 3 in this manner, in a next control cycle period, the routine proceeds to step S40 from step S2 through steps S12, S14, S22 and S34, and the second temporary capacity reduction control is carried out. When the lock-up clutch 20 is fully engaged by the second smooth-ON control of the second temporary capacity reduction control, the routine proceeds to step S44. Then, the flags F1, F2 and F3 are each set to 0 (the flags F1, F2 and F3 are each reset), and the fuel cut control is performed (at step S46).

Next, the second temporary capacity reduction control will be explained. As shown in FIG. 4, in the second temporary capacity reduction control, first, a judgment is made as to whether or not the flag F3 is 1 (at step S402). Since the flag F3 is set to 1 if the condition of the second slip control of the second temporary capacity reduction control is satisfied (at step S38 in FIG. 3), the routine proceeds to step S408. Then, a temporary clutch capacity reduction control, which decreases the torque transmission capacity $C_{LU}$ of the lock-up clutch 20 in a ramp shape by or over a plurality of the control cycle periods by decreasing the torque transmission capacity $C_{LU}$ by a predetermined capacity $c_1$ in each control cycle period, is carried out.

Here, regarding the flag F3, if the condition of the second temporary capacity reduction control is satisfied from the first smooth-ON control, the flag F3 is set to 1. And after that, if the torque transmission capacity $C_{LU}$ of the lock-up clutch 20 is decreased to the reference capacity (the coasting capacity learning value) $C_{LUL}$ by the second slip control of the second temporary capacity reduction control, the flag F3 is set to 2. And after that, if the acceleration OFF is determined, the flag F3 is set to 3. Moreover, in a case except the above, e.g. if the lock-up clutch 20 is fully engaged and the second slip control ends, the flag F3 is set to 0.

When the flag F3 is 1, as mentioned above, the clutch capacity reduction control of the second slip control is carried out. When the flag F3 is 2, the clutch capacity hold control of the second slip control is carried out. When the flag F3 is 3, the second smooth-ON control is carried out.

Subsequently, a judgment is made as to whether or not the torque transmission capacity $C_{LU}$ of the lock-up clutch 20 is decreased to the reference capacity (the coasting lock-up capacity) $C_{LUL}$ (at step S410). When the torque transmission capacity $C_{LU}$ of the lock-up clutch 20 is decreased in the ramp shape by or over the plurality of the control cycle periods, the torque transmission capacity is decreased up to the reference capacity $C_{LUL}$. Thus, the routine proceeds to step S412 from step S410, and the flag F3 is set to 2, then the clutch capacity hold control that holds the torque transmission capacity $C_{LU}$ of the lock-up clutch 20 to the reference capacity $C_{LUL}$ that is the lower limit value is carried out (at step S414).

Further, a judgment is made as to whether or not the acceleration OFF is determined (at step S416). Here, if the acceleration OFF is determined, the routine proceeds to step S418, and the flag F3 is set to 3. Then, the second smooth-ON control, which increases the torque transmission capacity $C_{LU}$ of the lock-up clutch 20 in a ramp shape by or over a plurality of the control cycle periods by increasing the torque transmission capacity $C_{LU}$ by a predetermined capacity $c_2$ in each control cycle period, is carried out (at step S420).

Furthermore, a judgment is made as to whether or not the torque transmission capacity $C_{LU}$ of the lock-up clutch 20 is increased up to the engagement capacity $C_{LUC}$ (at step S422). When the torque transmission capacity $C_{LU}$ of the lock-up clutch 20 is increased in the ramp shape by or over the plurality of the control cycle periods, the torque transmission capacity $C_{LU}$ is increased to the coasting travel engagement capacity $C_{LUC}$. Thus, the routine proceeds to step S424 from step S422, and the engagement of the lock-up clutch 20 is completed.

As explained above, according to the control device of the lock-up clutch of the present invention, when the coasting lock-up condition is satisfied, the lock-up clutch 20 is engaged by the coasting lock-up, and the engine brake can work during the coasting. Further, since the engine 1 is dragged from the driving wheel by the lock-up clutch 20, fuel efficiency can be improved with the engine 1 being in a fuel cut state.

In addition, when the acceleration ON is made during the coasting lock-up, the state of the lock-up clutch 20 is immediately changed from the engaged state to the slip state by the first slip control, and subsequently, the torque transmission capacity $C_{LU}$ is gradually increased in the ramp shape by the smooth-ON control. Therefore, it is possible to lessen the shock occurring due to the driving force step of the vehicle.

Since the state of the lock-up clutch 20 is immediately changed to the slip state by the first slip control, as shown by the two-dot chain line in FIG. 2C, the lock-up clutch 20 can immediately be returned to the engaged state while lessening the shock, and fuel efficiency can be improved with the lock-up clutch 20 engaged and with the engine 1 being in the fuel cut state.

Further, in this first slip control, the torque transmission capacity is decreased up to the middle capacity that is smaller than the reference capacity $C_{LUL}$ and greater than the slip control capacity $C_{LUS}$ at once (at one stroke), and subsequently decreased to the slip control capacity $C_{LUS}$ in the ramp shape. Therefore, while suppressing the disengagement of the lock-up clutch 20 which occurs due to overshoot of the decrease of the torque transmission capacity $C_{LU}$, the state of the lock-up clutch 20 can immediately be changed to the slip state.

Furthermore, in the case where the accelerator opening changes by the fact that the acceleration OFF is made immediately after the acceleration ON is made during the coasting lock-up, by the clutch capacity reduction control of the second slip control, as shown as a difference between the engine rotation speed Ne and the transmission input revolution speed INPREV in FIG. 2B, the torque transmission capacity $C_{LU}$ of the lock-up clutch 20 is decreased by the time when the lock-up clutch 20 slips with the engine 1 being in an idling state. It is therefore possible to avoid the abrupt engagement of the lock-up clutch 20. Additionally, since the lock-up clutch 20 has the torque transmission capacity $C_{LU}$ even in the slip state, the lock-up clutch 20 is not in the fully disengaged state. It is thus possible to suppress the engine racing (RPM surge) by an amount of the torque transmission capacity $C_{LU}$ of the lock-up clutch 20.

Moreover, since the torque transmission capacity $C_{LU}$ of the lock-up clutch 20 is held to the reference capacity $C_{LUL}$, which holds the slip state of the lock-up clutch 20, with the engine 1 being in the idling state until the accelerator opening becomes 0, even if the torque transmission capacity by which the lock-up clutch 20 is engaged decreases, the lock-up clutch 20 is not abruptly fully engaged. As a matter of course, the lock-up clutch 20 is also not abruptly fully disengaged.

Then, even when the vehicle is returned to the coasting state with a zero-state of the accelerator opening held, the hydraulic pressure supplied to the lock-up clutch 20 is gradually increased. Therefore, the torque transmission capacity $C_{LU}$ of the lock-up clutch 20 is also gradually increased, and shift to a full lock-up state can be smoothly done. Consequently, the engine 1 is dragged from the driving wheel by the lock-up clutch 20 even zero of the accelerator opening, and fuel efficiency can be improved with the engine 1 being in the fuel cut state.

In this manner, when the acceleration OFF is made before the full engagement during the progress of the gradual increase of the clutch capacity (i.e. during the progress of the gradual increase of the hydraulic pressure) toward the full engagement of the lock-up clutch 20 by the smooth-ON control through the first slip control by the fact that the acceleration ON is made during the coasting lock-up, as shown in FIG. 2, although a start of the fuel cut (F/C) is delayed from time t6 to time t7, the fuel cut can be executed with a relatively slight delay.

In particular, regarding the capacity reduction (the decrease of the capacity) by the clutch capacity reduction control of the second slip control, since the torque transmission capacity $C_{LU}$ of the lock-up clutch 20 is limited to the reference capacity $C_{LUL}$ that is the lower limit value, the fuel cut can be executed with a relatively slight delay. If this limit is not provided, there is a risk that the lock-up clutch 20 will be fully disengaged. Also, timing of the full engagement of the lock-up clutch 20 by the gradual increase of the torque transmission capacity $C_{LU}$ after this full disengagement is delayed as shown by a broken line in FIG. 2C.

Further, although the lock-up clutch 20 is engaged when the coasting lock-up condition is satisfied, at this time, the hydraulic pressure supplied to the lock-up clutch 20 is decreased and the hydraulic pressure at which the lock-up clutch 20 starts to slip is determined, then this hydraulic pressure is stored as the slip achieving hydraulic pressure. Therefore, an appropriate slip achieving hydraulic pressure can always be obtained, and it is thus possible to surely bring the lock-up clutch 20 into the slip state without bringing the lock-up clutch 20 into the fully disengaged state.

In addition, since the coasting lock-up capacity (the reference capacity) $C_{LUL}$ is learned and set by the learning control section 8C, the coasting lock-up capacity $C_{LUL}$ can be obtained accurately, and the control of the lock-up clutch 20 can be properly performed.

[Others]

Although the present invention is explained above, the present invention includes all design modifications and equivalents belonging to the technical scope of the present invention.

In the above embodiment, when the lock-up clutch is engaged during the coasting lock-up, i.e. during the coasting travel, the fuel cut is executed and this brings about improvement in the fuel efficiency. However, the fuel cut is not necessarily essential during the coasting lock-up control. Even if the fuel cut is not executed, the engine brake can work during the coasting, and an effect of improving operability or drivability of the vehicle can be obtained.

Further, in the above embodiment, the coasting lock-up capacity $C_{LUL}$ is set by the learning control section 8C.

However, it is possible to estimate the coasting lock-up capacity $C_{LUL}$ from the vehicle speed and/or a change of the vehicle speed during the coasting travel, and the learning control section 8C is not necessarily essential for the control device of the present invention.

The invention claimed is:

1. A control device controlling a lock-up clutch provided between an engine and an automatic transmission mechanism mounted in a vehicle by hydraulic pressure, the control device comprising:
   a coasting judgment unit that judges whether the vehicle is in a coasting travel state;
   an acceleration judgment unit that judges depression of an accelerator pedal of the vehicle, return of the depression of the accelerator pedal, acceleration ON and acceleration OFF; and
   a control unit that controls a torque transmission capacity of the lock-up clutch on the basis of judgment information of the coasting judgment unit and the acceleration judgment unit, and
   the control unit being configured to perform
      a coasting lock-up control that when a predetermined coasting lock-up condition is satisfied in a state in which the vehicle is in the coasting travel state, brings the lock-up clutch into a lock-up state,
      a first temporary capacity reduction control that when the acceleration ON of the accelerator pedal is judged in a state in which the lock-up clutch is in the lock-up state by the coasting lock-up control, brings the lock-up clutch into a slip state by decreasing the torque transmission capacity and subsequently returns the lock-up clutch to the lock-up state by increasing the torque transmission capacity, and
      a second temporary capacity reduction control that when the return of the depression of the accelerator pedal is judged during the progress of the returning of the lock-up clutch to the lock-up state by the first temporary capacity reduction control, decreases the torque transmission capacity again and subsequently returns the lock-up clutch to the lock-up state again by increasing the torque transmission capacity, and
   in the second temporary capacity reduction control, the torque transmission capacity being decreased with a predetermined torque transmission capacity by which the lock-up clutch is not fully disengaged being a lower limit value.

2. The control device of the lock-up clutch as claimed in claim 1, wherein:
   the predetermined torque transmission capacity is a torque capacity equivalent to an input torque that is inputted to the lock-up clutch when the vehicle is in the coasting travel state.

3. The control device of the lock-up clutch as claimed in claim 1, wherein:
   when the torque transmission capacity reaches the lower limit value before the acceleration OFF is judged by the acceleration judgment unit in the second temporary capacity reduction control, the control unit holds the torque transmission capacity to the lower limit value until the acceleration OFF is judged by the acceleration judgment unit.

4. The control device controlling the lock-up clutch as claimed in claim 3, wherein:
   when the acceleration OFF is judged by the acceleration judgment unit in a state in which the torque transmission capacity is held to the lower limit value, the control unitgradually increases the torque transmission capacity.

* * * * *